US009508078B1

(12) United States Patent
Traub et al.

(10) Patent No.: US 9,508,078 B1
(45) Date of Patent: Nov. 29, 2016

(54) LINK CREATION TECHNIQUES

(75) Inventors: Joseph Louis Traub, Lynnwood, WA (US); Jon Robert Ducrou, Seattle, WA (US); David Moore, Seattle, WA (US); Andrew Clive Wood, Seattle, WA (US); Sasha Mikhael Perez, Seattle, WA (US); Aya Mitake, Tokyo (JP)

(73) Assignee: Amazon Technologies, Inc., Seattle, WA (US)

( * ) Notice: Subject to any disclaimer, the term of this patent is extended or adjusted under 35 U.S.C. 154(b) by 1427 days.

(21) Appl. No.: 12/372,524

(22) Filed: Feb. 17, 2009

(51) Int. Cl.
*G06Q 30/02* (2012.01)
*G06F 3/0481* (2013.01)

(52) U.S. Cl.
CPC ............. *G06Q 30/02* (2013.01); *G06F 3/0481* (2013.01)

(58) Field of Classification Search
CPC ....................................................... G06Q 30/02
USPC ...... 705/14, 10, 26, 27, 14.71, 14.72, 14.73; 707/513; 715/805
See application file for complete search history.

(56) References Cited

U.S. PATENT DOCUMENTS

| 6,029,141 A * | 2/2000 | Bezos et al. ................. 705/27.1 |
| 2005/0071776 A1* | 3/2005 | Mansfield et al. ............ 715/805 |
| 2008/0262920 A1* | 10/2008 | O'Neill et al. ................ 705/14 |
| 2009/0106098 A1* | 4/2009 | Getz ............................. 705/14 |
| 2009/0172551 A1* | 7/2009 | Kane et al. ................... 715/733 |

* cited by examiner

*Primary Examiner* — Sun Li
(74) *Attorney, Agent, or Firm* — Lee & Hayes, PLLC

(57) ABSTRACT

Techniques for increasing the efficacy of an affiliate marketing program are described herein. These techniques may allow participants of the affiliate marketing program to easily create links to content that a content site offers. To do so, the content site may determine whether a user that requests content from the site is a participant of the program or a non-participant. Based at least in part on determining that the requesting user is a participant, the content site may serve the requested content in addition to a mechanism for creating links to the content. Furthermore, the mechanism may also illustrate or otherwise include content that is customized based on the content that the participant requests and/or based on an identity of the participant.

31 Claims, 12 Drawing Sheets

LINK CREATION TECHNIQUES

BACKGROUND

Affiliate marketing is a type of marketing practice in which an entity, such as a business, compensates or otherwise rewards one or more participants of the marketing program for causing customers to engage in certain desired practices. For instance, a business may reward a participant of an affiliate marketing program for causing a customer to purchase an item from the business. If the business operates a content site, the business may also reward the participant for driving traffic to the site.

Affiliate marketing can be an integral marketing strategy and, as such, businesses strive to increase the reach and efficacy of this powerful tool.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical items.

FIG. 3 illustrates that the UI may include information that overlays the UI of FIG. 2.

DETAILED DESCRIPTION

Figure 1:
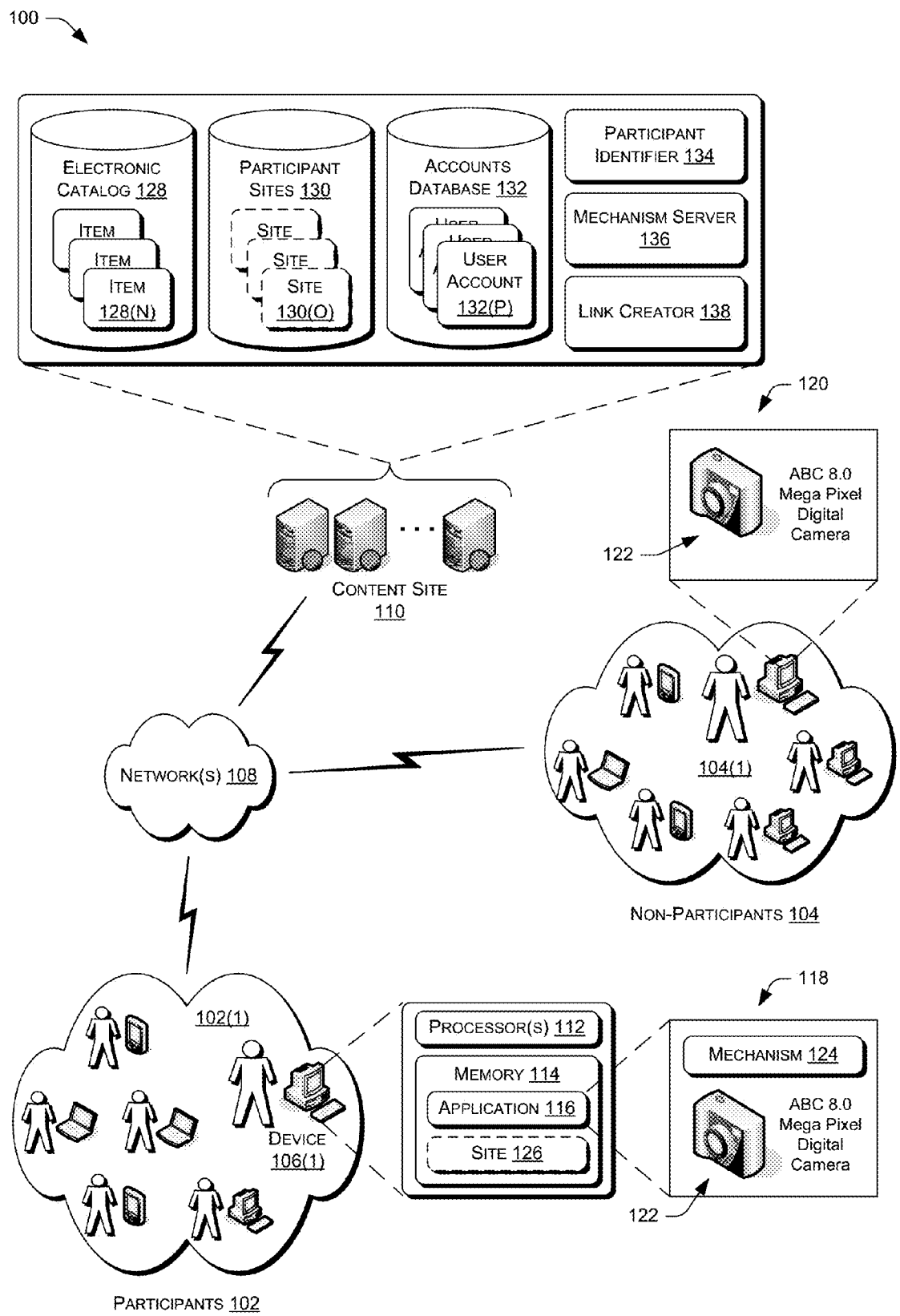
FIG. 1 illustrates an example architecture that includes a content site, participants of an affiliate marketing program that the content site offers, and non-participants of the program. Here, the content site may serve different content to different users based at least in part on whether a user is a participant or a non-participant.

This disclosure is directed, in part, to techniques for enhancing the experience of a participant of an affiliate marketing program. For instance, the techniques may simplify placement of links or items into a site that is associated with a participant of an affiliate marketing program. An entity, such as a content site, may provide an affiliate marketing program that rewards participants of the program for causing users to engage in certain desired practices. For instance, the content site may reward a participant of the affiliate marketing program for causing a customer to purchase an item from the content site or for driving traffic to the site.

To encourage users to engage in these practices, a participant of the program may navigate to the content site for the purpose of creating links to user interfaces and/or to items hosted by the site for placement onto the site of the participant. In some instances, the site of the participant is separate from the content site.

Upon a user navigating to the content site, the site may determine whether or not the navigating user is a participant of the affiliate marketing program. If so, the content site may serve, to a computing device of the participant, content requested by the device (e.g., content associated with a particular requested uniform resource locator (URL)) in addition to a mechanism for creating links to the content. By serving this mechanism, the site allows the participant to more easily create the desired links and, as such, increases the likelihood that the participant will create these links for placement onto the site of the participant. By increasing the number of links on participant sites, the content site increases the size and, likely, the efficacy of the affiliate marketing program.

In contrast to the described techniques, traditional techniques for allowing a participant of an affiliate marketing program to create links are more burdensome. For instance, these techniques often require that a participant first navigate to a content site to locate a URL for which the participant wishes to create a link for placement onto the participant's site. The participant then copies this URL and navigates (e.g., via opening of a new browser window) to a site associated with the affiliate marketing program. This site then allows the participant to create the desired link. As such, the participant pastes the copied URL into a provided text box and proceeds to receive the code necessary to insert the link into the participant's site. Once the participant receives and copies this code, the participant navigates to a third location for entry of the copied code into the site of the participant. After navigating to these three locations, the participant's site finally includes the desired link to the original URL at the content site.

With the described techniques, however, a content site serves both requested content (e.g., content associated with a requested URL) in addition to a mechanism to create links to the requested content. As such, the techniques allow the user to easily create a desired link from the requested content before navigating to the participant's site to insert the created link.

In addition or in the alternative to serving the mechanism to create links, the content site may also serve content that is customized for the participant based on the requested content (e.g., based on the requested URL) and/or based on an identity of the participant. In both instances, the techniques enhance the experience of the participant of the affiliate marketing program and, as such, likely result in a more successful affiliate marketing program for the content site.

The discussion begins with a section entitled "Illustrative Architecture", which describes a non-limiting environment in which a content site may serve varying content based on whether users are participants or non-participants of an affiliate marketing program. A section entitled "Illustrative User Interface and Flow Diagrams" follows. This section depicts and describes, in part, examples of user interfaces (UIs) that may be served to and rendered at the participant devices of the users of FIG. 1. The discussion then concludes with a section entitled "Illustrative Processes", which describes processes for implementing the claimed techniques, and a brief conclusion.

This brief introduction, including section titles and corresponding summaries, is provided for the reader's convenience and is not intended to limit the scope of the claims, nor the proceeding sections. Furthermore, the techniques described above and below may be implemented in a number of ways and in a number of contexts. Several example implementations and contexts are provided with reference to the following figures, as described below in more detail. However, the following implementations and contexts are but a few of many.

Illustrative Architecture

FIG. 1 illustrates an example architecture 100 that may implement techniques for enhancing the experience of a participant of an affiliate marketing program. In architecture 100, one or more participants 102 of an affiliate marketing program and/or one or more non-participants 104 employ user computing devices to access, via a network 108, a representative content site 110. Content site 110 may comprise any sort of site that supports user interaction, including e-commerce sites, informational sites, social networking sites, search engine sites, news and entertainment sites, and so forth. Additionally, the site is representative of proprietary sites that receive requests and provide content over proprietary networks other than the Internet and public web. Furthermore, while the illustrated example represents users 102 and 104 accessing content site 110, the described techniques may equally apply in instances where these users interact with a service provider in any other client/server arrangements or non-client/server arrangements (e.g., locally-stored software applications, set-top boxes, electronic reading devices, personal digital assistants, etc.).

Here, a participant 102(1) of the affiliate marketing program accesses content site 110 via network 108. Network 108 may include any one or combination of multiple different types of networks, such as cable networks, the Internet, and wireless networks. The computing devices of participants 102 and non-participants 104, meanwhile, may each be implemented as any number of computing devices, including as a personal computer, a laptop computer, a portable digital assistant (PDA), a cell phone, a set-top box, a game console, a personal media player (PMP), and so forth. As illustrated, a computing device 106(1) of a participant 102(1) is equipped with one or more processors 112 and memory 114 to store applications and data. An application 116, such as a browser or other client application, running on device 106(1), facilitates access to site 110 over network 108.

Content site 110 is hosted on one or more servers having processing and storage capabilities. In one implementation, the servers might be arranged in a cluster or as a server farm, although other server architectures may also be used to host the site. The site is capable of handling requests from many users and serving, in response, various user interfaces of content that can be rendered at the client computing devices for viewing by users 102 and 104. For instance and as illustrated, site 110 may serve a user interface 118 (e.g., a web page) to the computing device of participant 102(1) and a user interface 120 to a computing device of non-participant 104(1). As discussed in detail below, site 110 may serve different user interfaces to these computing devices based on identities of the respective users. For instance, site 110 may serve a first user interface to a participant of the affiliate marketing program and a second, different user interface to a non-participant of the affiliate marketing program.

For instance and as illustrated, user interface 118 (that site 110 serves to participant 102(1)) includes content 122 that participant 102(1) requested as well as a mechanism 124. User interface 120 (that site 110 serves to non-participant 104(1)), meanwhile, includes the requested content 122 but does not include mechanism 124. Content 122 may comprise a page (e.g., a web page) associated with a particular URL that participant 102(1) and non-participant 104(1) requested via their respective computing devices. For instance, content 122 may comprise an item detail page that contains details about a particular item. Here, content 122 of each user interface 118 and 120 comprises an item detail page for a digital camera that site 110 offers for consumption (e.g., purchase, rent, lease, etc.). Of course, content 122 may also comprise any other content, such as a home page, a search page, an email, or the like.

Mechanism 124 may allow participant 102(1) to easily create a link to content 122 for insertion into a site associated with the participant 102(1). As illustrated, computing device 106(1) of participant 102(1) may host a site 126 associated with the participant. Conversely or additionally, content site 110 (or another entity) may host site 126 associated with participant 102(1). In still other instances, a third party may host the user's site. For instance, an entity that hosts user blogs or other sites may host site 126. In these instances, participant 102(1) may employ computing device 106(1) to push content to the site 126 that the third party entity hosts.

In each of these instances, the site of the participant may be considered separate from the content site. That is, site 126 may be discrete and independent from content site 110. Also, in either instance mechanism 124 may allow participant 102(1) to create a link to content 122 (e.g., the item detail page of the illustrated camera) so that participant 102(1) may insert this link into site 126. Therefore, when another user navigates to site 126, this other user may select the created link in order to navigate to content 122 hosted by site 110. As discussed above, in response to driving traffic to site 110 and/or in response to users consuming items that site 110 offers for consumption after selecting a link at the participant's site 126, content site 110 may reward participant 102(1). Because mechanism 124 allows participant 102(1) to easily create links, participant 102(1) is able to more easily insert links into site 126 and, hence, is likely to better drive traffic to content site 110.

FIG. 1 illustrates that content site 110 may include an electronic catalog 128, a participant-site database 130, an accounts database 132, a participant identifier 134, a mechanism server 136, and a link creator 138. Electronic catalog 128 of site 110 may store or otherwise have access to one or more items 128(1), . . . , 128(N) that site 110 offers for consumption. An item includes anything that content site 110 wishes to offer for purchase, rental, subscription, viewing, informative purposes, or some other form of consumption. In some embodiments, the item may be offered for consumption by the content site itself, while in other embodiments content site 110 may host items that others are offering via the site. An item can include a product, a service, a digital download, a news clip, customer-created content, information, or some other type of sellable or non-sellable unit.

Content site 110 may use electronic catalog 128 to serve user interfaces to requesting users. For instance, site 110 may use electronic catalog 128 to serve user interfaces 118 and 120 that include item details about the illustrated digital camera.

Content site 110 may also include participant-site database 130, which may include one or more sites 130(1), . . . , 130(O) associated with a corresponding participant of the affiliate marketing program that content site 110 offers. As discussed above, sites 130(1)-(O) may comprise content provided by a corresponding participant. In some instances, a portion of this content comprises links to items within electronic catalog 128 or other content of site 110. For instance, sites 130(1)-(O) may comprise links to item detail pages, search results pages, a home page of content site 110, customer reviews, recommendation pages, or any other content offered by site 110, other sites, and/or any other content provided by a corresponding participant.

Accounts database 132, meanwhile, stores one or more user accounts 132(1), . . . , 132(P) associated with corresponding users of content site 110. For instance, accounts database 132 may store a user account associated with participant 102(1) and non-participant 104(1). Accounts database 132 may store a myriad of details about a corresponding user, such as addresses, delivery methods, payment instruments, item preferences, whether or not a user is a participant of the affiliate marketing program, and the like. Furthermore, each user account may also store one or more identifiers of computing devices associated with corresponding users.

For instance, a user account associated with participant 102(1) may store an identifier (e.g., a cookie) of a computing device 106(1). Therefore, when computing device 106(1) requests content from content site 110 (e.g., via submission of a URL address) participant identifier 134 may utilize the identifier of the device to match the device with the identifier stored in the user account of participant 102(1). When participant identifier 134 identifies participant 102(1) as a participant of the affiliate marketing program, site 110 may not only serve the requested content 122, but mechanism server 136 may also serve mechanism 124. Similarly, participant identifier 134 may determine that non-participant 104(1) indeed does not participate in the affiliate marketing program. As such, site 110 serves requested content 122, while mechanism server 136 refrains from serving mechanism 124 to the computing device of the non-participant.

In response to receiving requested content 122 and mechanism 124, participant 102(1) may use mechanism 124 to request to create a link to content 122 or other content that site 110 offers. In response to this request, link creator 138 may create code for the link and may return this code to the participant. This code may include an identification of participant 102(1) such that when other users select this link, site 110 may determine that participant 102(1) was responsible for driving that particular traffic to the site.

Once participant 102(1) receives the created link, participant 102(1) may then insert this link into site 126 of participant 102(1). As discussed above, this created link may include an identification of participant 102(1). As such, when other users select the link to navigate to site 110, site 110 may determine that these users entered site 110 via site 126. As such, if these users engage in desired activities (e.g., if one of the users purchases or otherwise consumes an item), then site 110 may reward participant 102(1).

Again, by serving mechanism 124 along with requested content 122 to participant 102(1), site 110 greatly simplifies the process for user 102(1) to create a link to content 122. By doing so, site 110 greatly increases the likelihood that participant 102(1) will create such a link for insertion into site 126 of the participant. It also follows that increasing the number of created links to site 110 within participant sites will likely increase the efficacy and reach of the affiliate marketing program that site 110 offers.

Illustrative User Interfaces and Flow Diagrams

Figure 2:
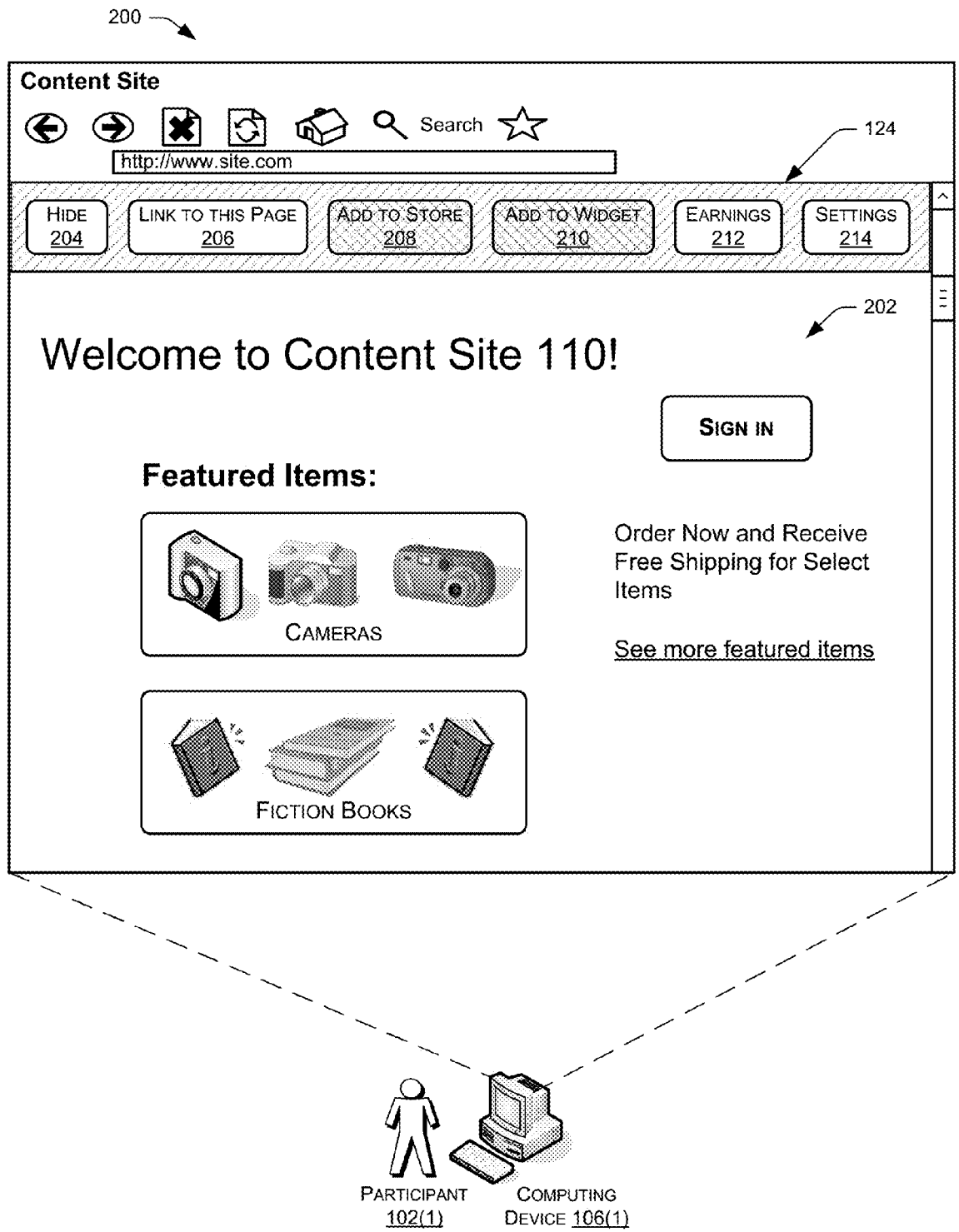
FIG. 2 illustrates an example user interface (UI) that the content site of FIG. 1 may serve to a participant of the affiliate marketing program. As FIG. 2 illustrates, this UI includes requested content and a mechanism for creating a link to the content.

FIGS. 2-11 illustrate example user interfaces and example flow diagrams for implementing the claimed techniques. First, FIG. 2 illustrates an example user interface (UI) 200 that content site 110 of FIG. 1 may serve to a participant (e.g., participant 102(1)) of an affiliate marketing program that site 110 offers. As FIG. 2 illustrates, this UI includes requested content 202 and mechanism 124 for creating a link to the content. Here, requested content 202 comprises content associated with a URL requested by computing device 106(1). As such, content 202 here comprises a home page of site 110.

Mechanism 124, meanwhile, is illustrated as being in the form a toolbar that includes multiple icons for user selection. While FIG. 2 illustrates mechanism 124 as a toolbar situated at the top of user interface 200, other implementations may employ other visual or non-visual techniques to achieve the functionality of mechanism 124, such as through a browser plug-in, hotkey functionality or the like. For instance, linking mechanism 124 may comprise Javascript that is embedded within the served user interface. Upon recognizing the predefined key stroke(s) (or "hotkey(s)"), the script may cause the desired action (e.g., the creation of the link). For instance, this embedded script may listen for a keystroke "L" and, in response to detecting this stroke, cause display of a link creation dialog box or the like.

The illustrated toolbar here includes an icon 204 entitled "Hide," an icon 206 entitled "Link to this Page," an icon 208 entitled "Add to Store 208," an icon 210 entitled "Add to Widget," an icon 212 entitled "Earnings," and an icon 214 entitled "Settings." While FIG. 2 illustrates several example icons of mechanism 124, it is to be appreciated that other implementations may employ more or fewer icons. For instance, other implementations may include an icon that, when selected, navigates the participant to a discussion board and/or a blog for participants of the affiliate marketing program. Other icons may includes a link to pictures of a currently-illustrated item or other items, a link to reviews of a currently-illustrated item or other items, shipping options for a currently-illustrated item or other items, additional information about a currently-illustrated item or other items, and the like.

With use of hide icon 204, participant 102(1) may choose to view or hide mechanism 124. For instance, if participant 102(1) selects icon 204, mechanism 124 may become hidden except for icon 204. When participant 102(1) reselects icon 204, mechanism 124 may reappear in its full form.

Figure 3:
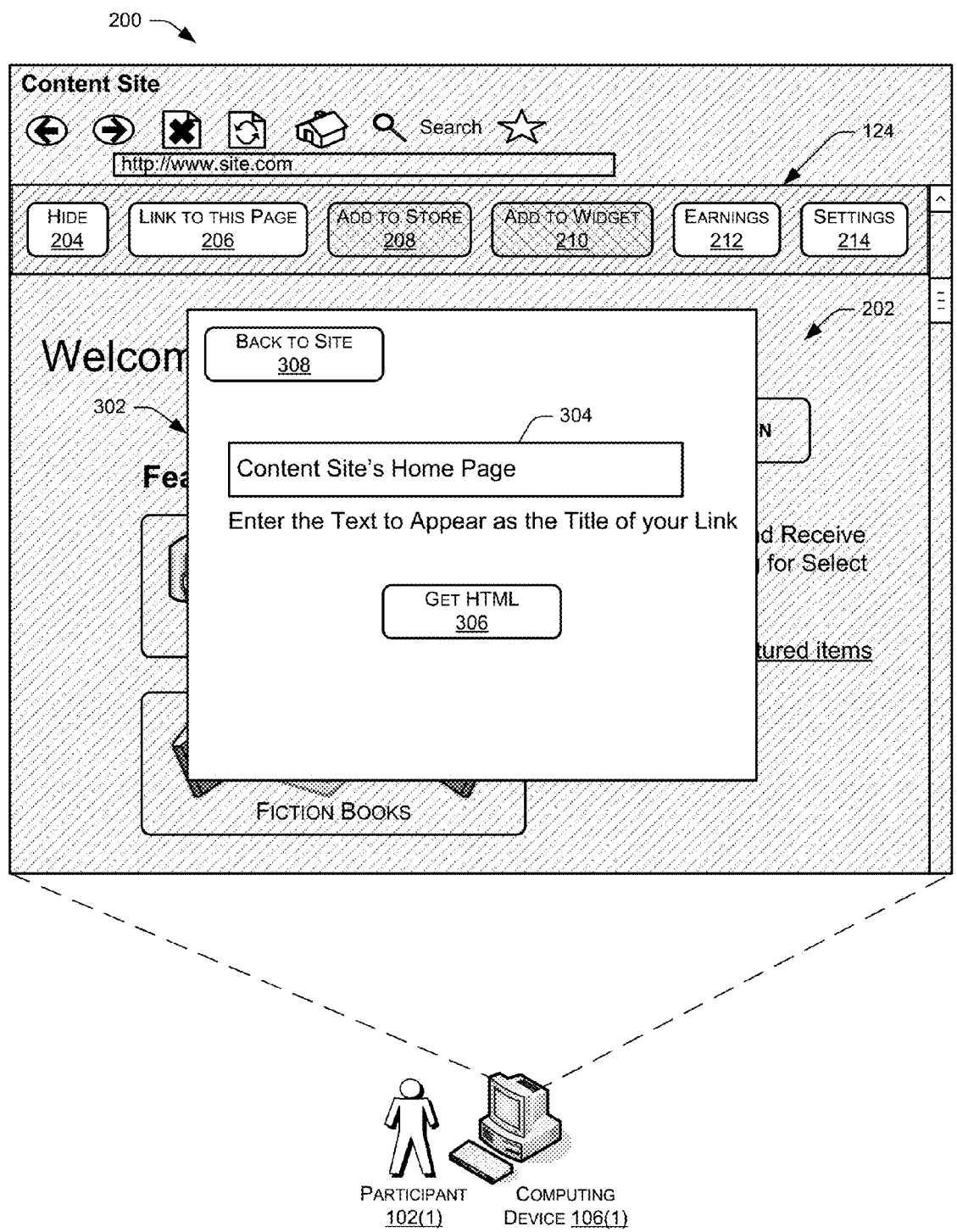
FIG. 3 illustrates an example UI that the content site may serve in response to the participant choosing to create a link to content of the UI of FIG. 2.

Icon 206, meanwhile, allows participant 102(1) to create a link to the currently illustrated content 202 or to other content that site 110 offers or otherwise. For instance, participant 102(1) may select icon 206 in order to create a link to the illustrated URL (http://www.site.com) that corresponds to the home page of content site 110. FIG. 3, discussed below, illustrates user interface 200 after participant selects icon 206. Once created, participant 102(1) may insert the created link into a site associated with participant 102(1) (e.g., site 126). Also as discussed above, this created link may include an identifier associated with participant 102(1) such that site 110 may determine whether or not users that visit the page associated with content 202 navigated there from the participant's site.

In addition to icon 206 ("link to this page"), mechanism 124 may include icons 208 and 210 ("Add to Store" and "Add to Widget," respectively). Here, however, mechanism 124 has grayed out icons 208 and 210. That is, while participant 102(1) may select icons 204, 206, 212, and 214, participant 102(1) may not select icons 208 and 210 from the current page.

In some instances, a participant may select "link to this page" to create a link to any sort of content that site 110 offers. In order to add an item to a store of the participant (a type of participant site, discussed in detail below) via selection of icon 208, however, the participant may need to navigate to a page associated with one or more particular items, such as an item detail page of an item, a customer reviews page associated with the item, or any other type of page associated with the item(s). At this point, mechanism 124 may remove the gray-out placed over icon 208. That is, icon 208 may become active and available for selection by the participant. Similarly, in order to create a link within a widget on a site of the participant (via selection of icon 210), the participant may first need to navigate to a page associated with a particular item, as discussed in detail below.

As illustrated, mechanism 124 also includes icon 212 ("Earnings"). Upon selection of icon 212, mechanism 124 may cause display of the earnings that participant 102(1) has accumulated through participation in the affiliate marketing program. For instance, selection of icon 212 may cause display of the participant's earnings for the current pay period on mechanism 124, as a pop up box over content 202, as an overly on top of content 202, or in any other visual or audible manner.

Finally, illustrated mechanism 124 includes icon 214 ("Settings"). Selection of icon 214 may allow participant 102(1) to alter settings associated with mechanism 124. For instance, participant 102(1) may choose whether or not the participant wishes to view mechanism 124 upon navigation to site 110. If not, site 110 may refrain from serving mechanism 124 to the participant, similar to the manner in which the site refrains from serving the mechanism to non-participants of the affiliate marketing program. Furthermore, participant 102(1) may select which of icons 204-214 that participant wishes to display on mechanism 124.

FIG. 3 illustrates user interface 200 after participant 102(1) selects to "link to" the illustrated content via selection of icon 206. In response to this selection, site 110 serves, and computing device 106(1) renders, an overlay 302 for allowing the participant to receive the code for the created link. With use of overlay 302, site 110 conveniently allows participant 102(1) to copy the created link without having to navigate away from user interface 200. That is, overlay 302 obviates the need for participant 102(1) to navigate not only to the illustrated home page to acquire the associated URL, but also to a page associated with the affiliate marketing program for the creation of the link associated with the acquired URL. As discussed above, this configuration results in a much more user-friendly process of creating a link to the illustrated content 202 and, as such, likely results in a greater participation of participants 102. It is noted that while FIG. 3 illustrates overlay 302, other implementations may employ other tools for allowing participant to create the link, such as a pop-up window or direct navigation of the participant's browser to the contents of overlay 302.

As illustrated, overlay 302 includes a text box 304, an icon 306 (entitled "Get HTML"), and an icon 308 (entitled "Back to Site") that, when selected, closes overlay 302 and returns participant 102(1) to illustrated content 202 and mechanism 124. Here, participant 102(1) may enter the text that the participant wishes to appear as the title of the created link. For instance and as illustrated, participant may enter the text "Content Site's Home Page," such that when participant places the link onto his or her site the link may appear as follows: "Content Site's Home Page." Upon selection of this link on the participant's site, a user may navigate to the underlying URL (http://www.site.com).

Once participant 102(1) has entered the text, participant 102(1) may select icon 306 in order to receive the code for entry into the participant's site. While icon 306 describes HTML, it is to be appreciated that other implementations may employ any other suitable format.

Figure 4:
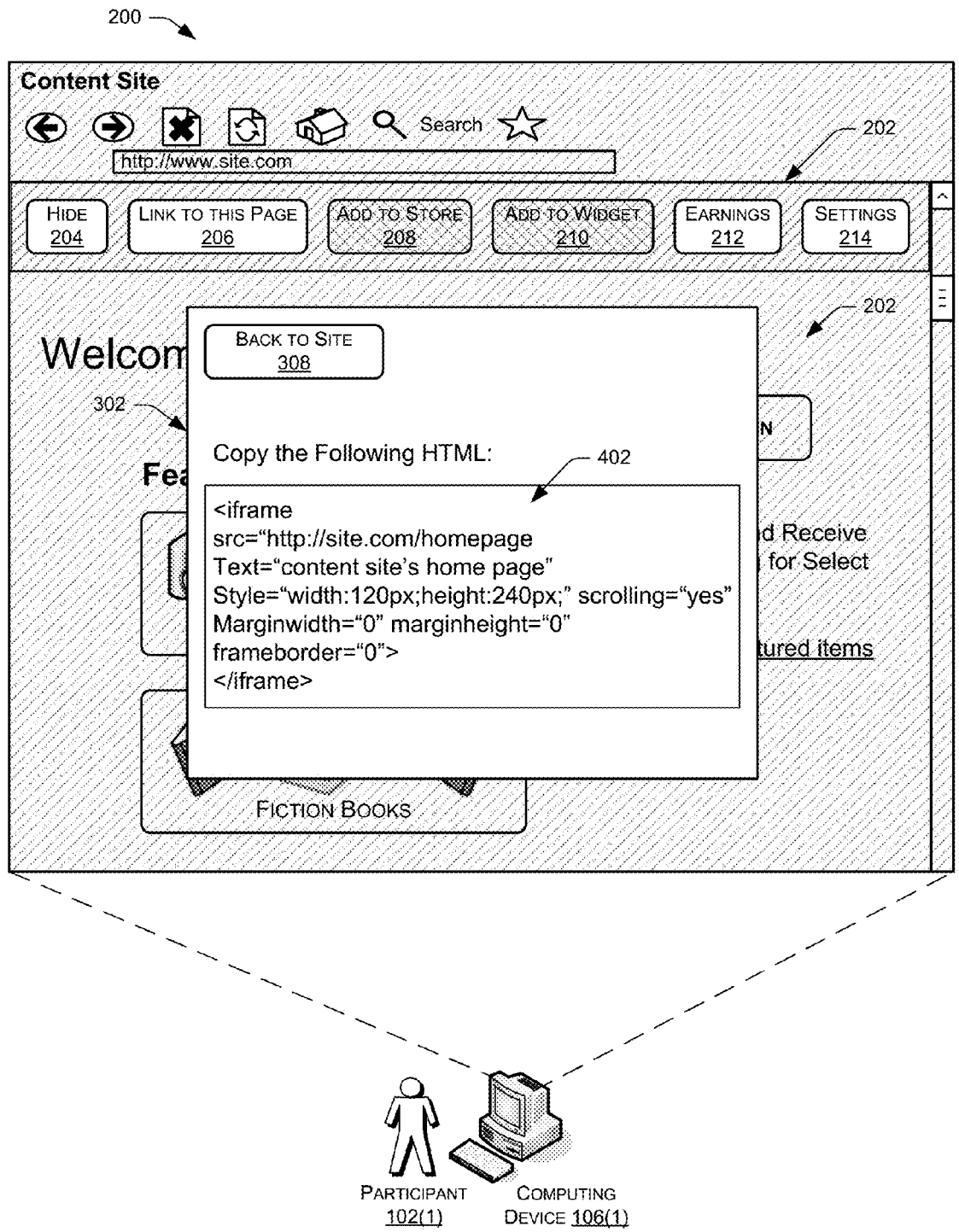
FIG. 4 illustrates an example UI that the content site may serve in response to the participant choosing to receive HTML or other code for the created link.

FIG. 4 illustrates overlay 302 once participant 102(1) selects icon 306. As illustrated, site 110 has returned the HTML code 402 for the link. Participant 102(1) may then copy this code, navigate to his or her site 126, and paste the copied code into his or her site. As discussed above, code 402 may include an identification of participant 102(1) such that site 110 will credit later user selections of the created link from site 126 to participant 102(1).

While FIG. 4 illustrates that overlay 302 allows participant 102(1) to copy the HTML for insertion into the participant's site, in other instances site 110 may additionally or alternatively store this code (at the site and/or on device 106(1)) in response to participant 102(1) selecting icon 306. That is, site 110 may store this code in association with a user account of participant 102(1) for the later use of participant 102(1). By doing so, site 110 may allow participant 102(1) to navigate to multiple pages and create multiple links before finally copying some or all of the code associated with these links for insertion into the site associated with the participant.

Figure 5:
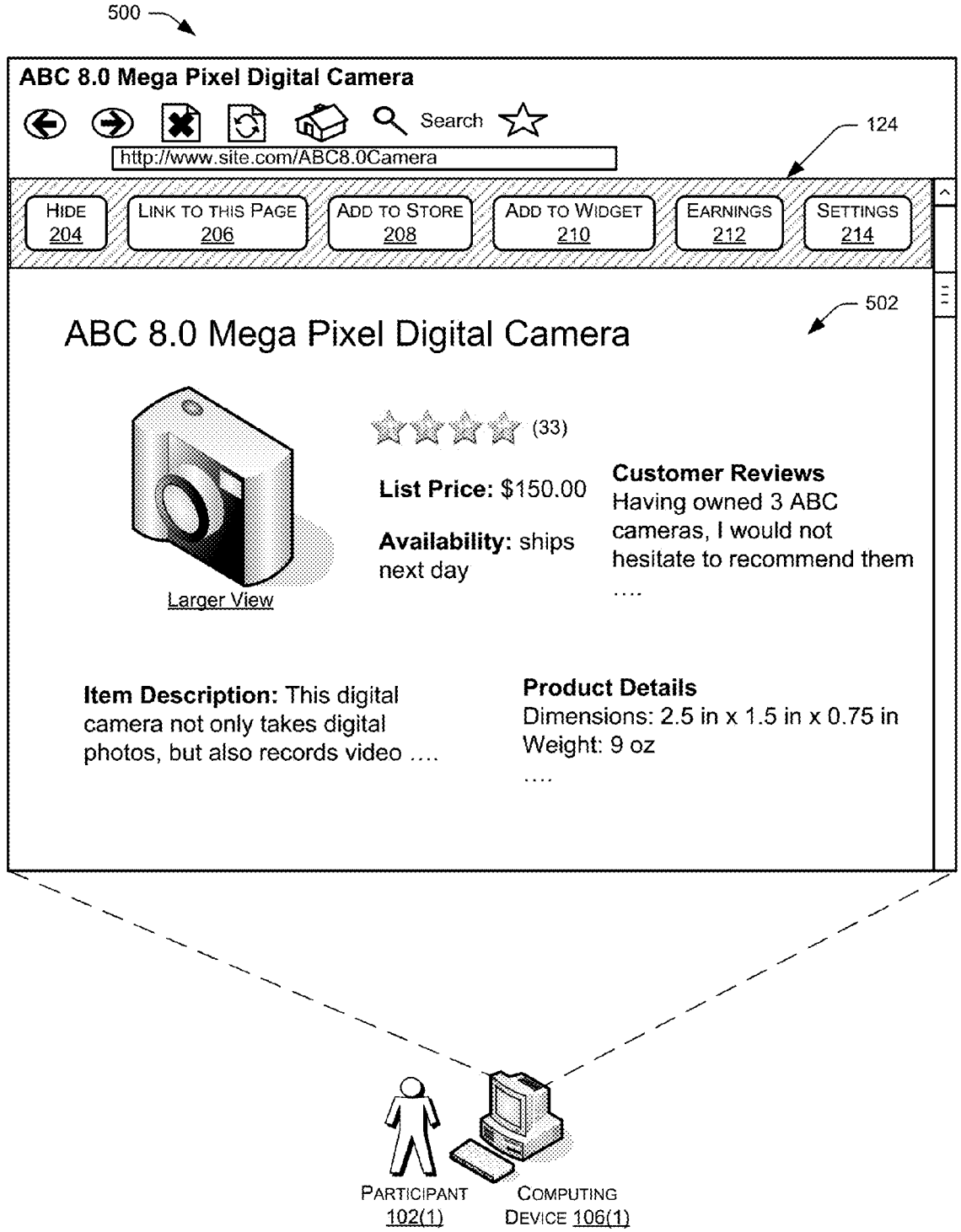
FIG. 5 illustrates an example UI that the content site may serve when the participant requests to view details about a particular item that the content site offers for consumption. Here, the mechanism to create a link to the illustrated content includes different (e.g., additional) options because of the substance of content.

FIG. 5 illustrates another user interface 500 that site 110 may serve to computing device 106(1) of participant 102(1). Here, user interface 500 includes mechanism 124 along with content 502. Content 502 comprises an item detail page associated with an item that content site 110 offers for sale. Because this content is associated with a particular item, mechanism 124 here illustrates that icons 208 and 210 are available for selection. That is, these icons are no longer grayed out as illustrated in FIG. 2.

Furthermore, user selection of icon 206 ("Link to this Page") may allow a participant to create an "item link" (or, in some instances, a "product link") when the rendered content is associated with a particular item or items. When, however, the content is not associated with a particular item(s), selection of icon 206 may allow the user to create a "text link." In some instances, site 110 may provide more options to the participant when the participant requests to create an item link rather than a text link. Returning to the example of FIGS. 2-4 and participant 102(1) requesting to create a link to the site's home page, site 110 created a text link in response to participant 102(1) selecting icon 206, as the illustrated home page is not associated with a particular item(s). Furthermore, note that at FIG. 3, site 110 simply asked participant 102(1) to enter the text to appear as the link and did not provide further options or configurations for the link.

Figure 6:
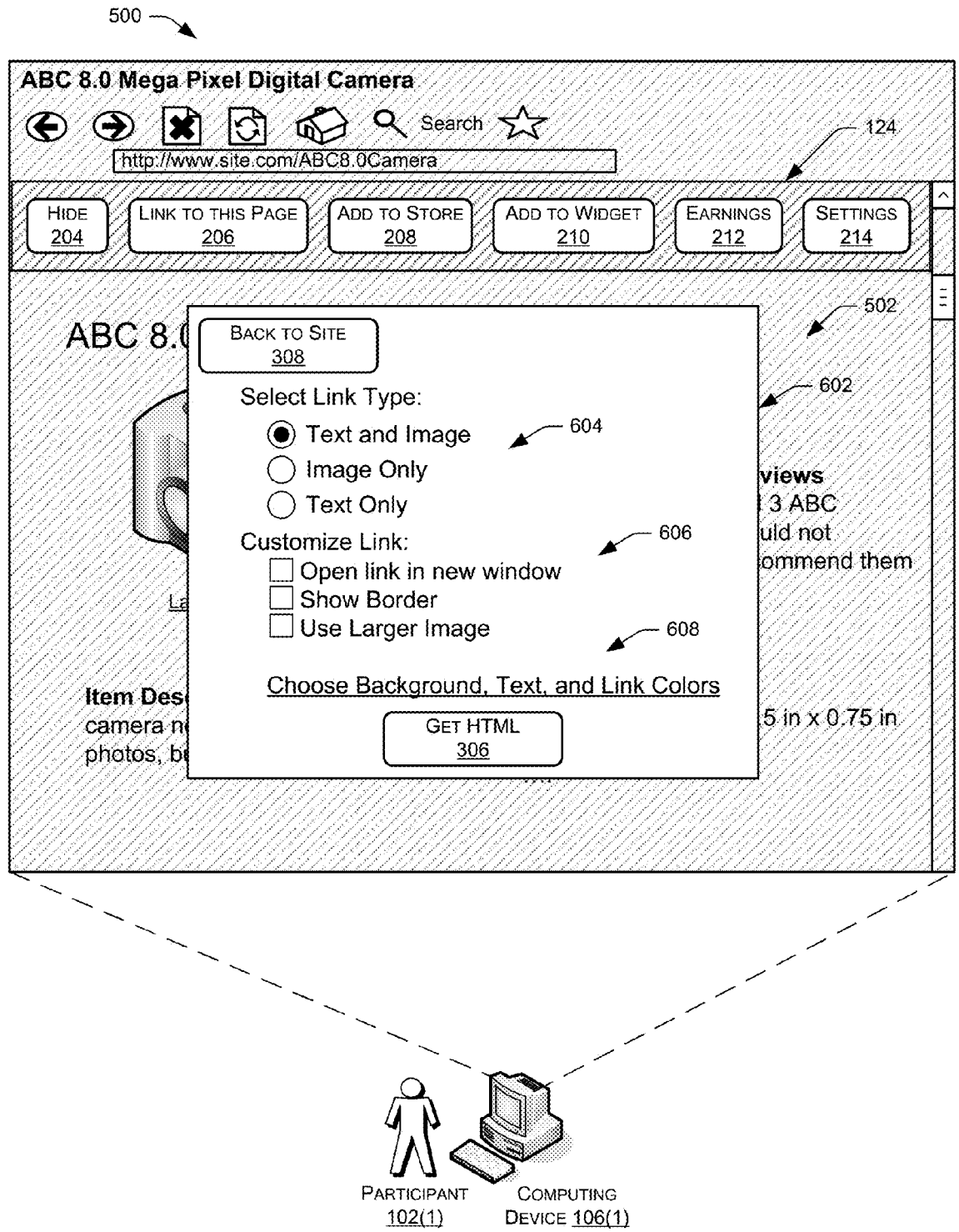
FIG. 6 illustrates an example UI that the content site may serve in response to the participant choosing to create a link to content of the UI of FIG. 5. Again, this UI includes different options than the UI of FIG. 3 based on the substance of the content.

Returning to FIG. 5, because content 502 is associated with a particular item, user selection of icon 206 ("Link to this Page") may allow the participant to create an item link. FIG. 6 illustrates an example overlay 602 that site 110 may serve to computing device 106(1) in response to participant selecting icon 206 from user interface 500. As illustrated, overlay 602 includes additional options for participant 102 (1) to choose from when requesting to create the link to the item detail page of the illustrated digital camera.

For instance, overlay 602 may include an option 604 that allows participant to choose whether the created link should include both "text and [an] image," an "image only," or "text only." If user selects, "Text and Image," the code that site 110 serves back to participant 102(1) may cause the link to include both text and an image of the illustrated item when participant 102(1) inserts the link into the site of the participant. For instance, the link may include a textual description (participant-generated or otherwise) and an image of the digital camera when participant 102(1) inserts the code into his or her site. Conversely, participant 102(1) may choose to create a "text only" link or an "image only" link.

Overlay 602 also allows participant 102(1) to further customize the link. For instance, participant 102(1) may specify, via an option 606, whether or not the content associated with the link should open in a new browser window when a user selects the link from the site of the participant. Participant 102(1) may also choose whether or not to display a border around the link, as well as whether or not to use a large image of the illustrated item, such as the camera. Finally, overlay 602 may also include an option 608 that allows the participant to choose a background color for the link, a color for the textual description of the link, and/or a color of the link itself. Upon selection of icon 306 ("Get HTML"), site 110 may serve code for the link for the participant to copy and paste or otherwise insert into the site of the participant. This code may correspond to the user selections made in overlay 602. Furthermore, while overlay 602 illustrates example options that site 110 may serve to a participant that requests to create an item or product link, it is to be appreciated that these options are merely examples, and that other implementations may employ more or fewer options that are similar or different.

Figure 7:
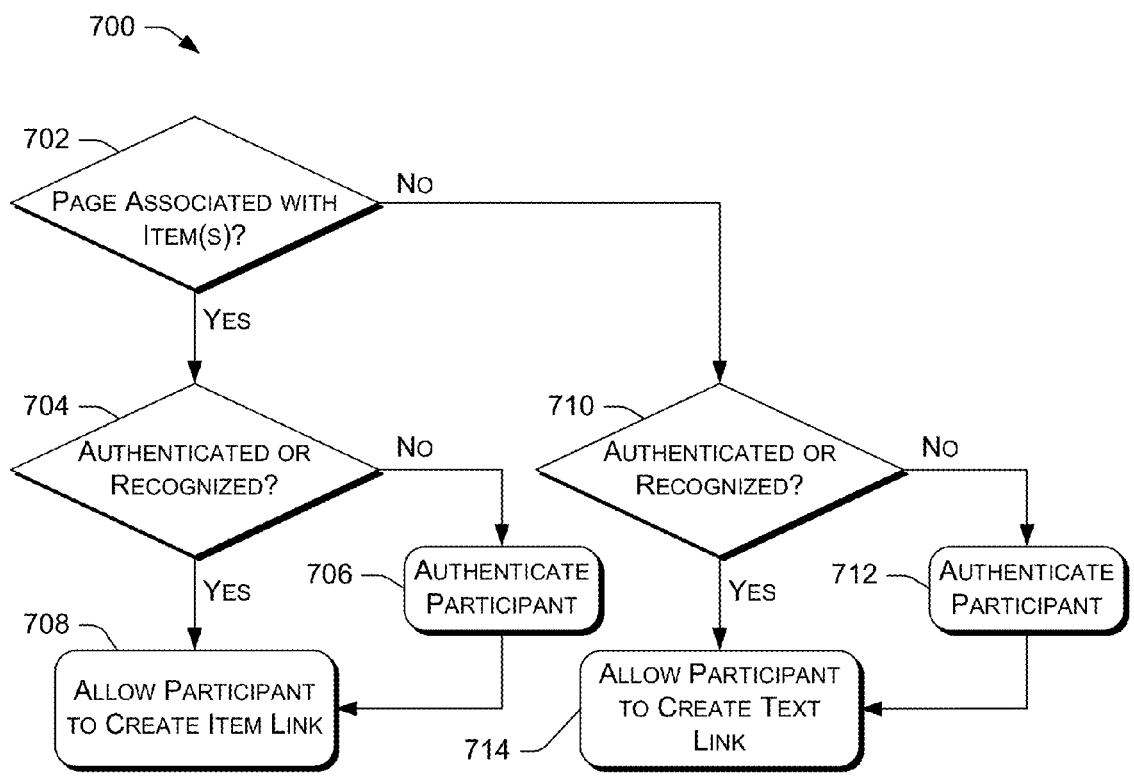
FIG. 7 illustrates an example flow diagram that the content site may implement when a participant chooses to create a link.

FIG. 7 illustrates an example process 700 that content site 110 may implement when a participant chooses to create a link. For instance, site 110 may implement process 700 in response to participant 102(1) selecting icon 206 from example user interfaces 200 or 500. Process 700 includes operation 702, at which point site 110 determines whether the content illustrated at the participant's device is a page that is associated with a single item. For instance, site 110 may determine whether this content is an item detail page for a particular item, a customer reviews page for a particular item, or any other page associated with a particular item. Furthermore, in other instances, site 110 may determine whether this content is associated with multiple known items.

In response to a determination that the illustrated content is associated with a particular item or items, process 700 proceeds to operation 704. Here, site 110 determines whether or the not the participant that is requesting to create the link is currently authenticated with the site or, in some instances, recognized by the site. If not, operation 706 requests that the participant authenticate by, for instance, signing into his or her account with site 110. To do so, site 110 may serve an authentication user interface that allows the participant to sign in or otherwise authenticate. After the participant authenticates at operation 706 (or after site 110 determines that the participant is already authenticated at operation 704), site 110 allows the participant to create an item link at operation 708 for insertion into a site of the participant. For instance, site 110 may allow the participant to create a link to a product that site 110 offers for sale or for any other form of consumption. As discussed and illustrated above with reference to FIGS. 5-6, an item link may include options that are different (e.g., additional) than those that site 110 offers for creation of a text link.

If, however, operation 702 determines that the content that the participant currently views is not associated with a particular one or more items, then process proceed to operation 710. Here, site 110 again determines whether or not the participant is authenticated or recognized. If not, operation 712 authenticates the participant. If so, operation 714 allows the participant to create a text link to the illustrated content for insertion into a site associated with the participant. Again, this text link may include option similar or different to those described and illustrated with reference to FIGS. 2-4.

Returning to the illustration of FIG. 5, mechanism 124 allows participant 102(1) to "Link to [the illustrated] Page" (as discussed immediately above), as well as to "Add [the illustrated item] to [a] Store" of the participant or "Add [the illustrated item] to [a] Widget" on a site of the participant. Addressing the store example first, a participant of an affiliate marketing program, such as participant 102(1), may be associated with a store that includes links to one or more items of electronic catalog 128 that site 110 offers for consumption. For instance, a participant may create and/or manage a store that is associated with a particular category or genre of items, such as electronics or digital cameras. As such, participant may include, on the store, item descriptions, item reviews, external links, links to items in electronic catalog 128 and/or a host of additional content.

Based on this description of a participant store, these stores may comprise a subset of sites to which participants of an affiliate marketing program may insert created links. As FIG. 1 illustrates and as discussed above, site 110 may host participant sites 130(1)-(O) (such as participant stores), or participants or other entities may host these sites instead. In each of these instances, selection of icon 208 on mechanism 124 may allow a participant to add an illustrated item to a store of the participant.

Figure 8:
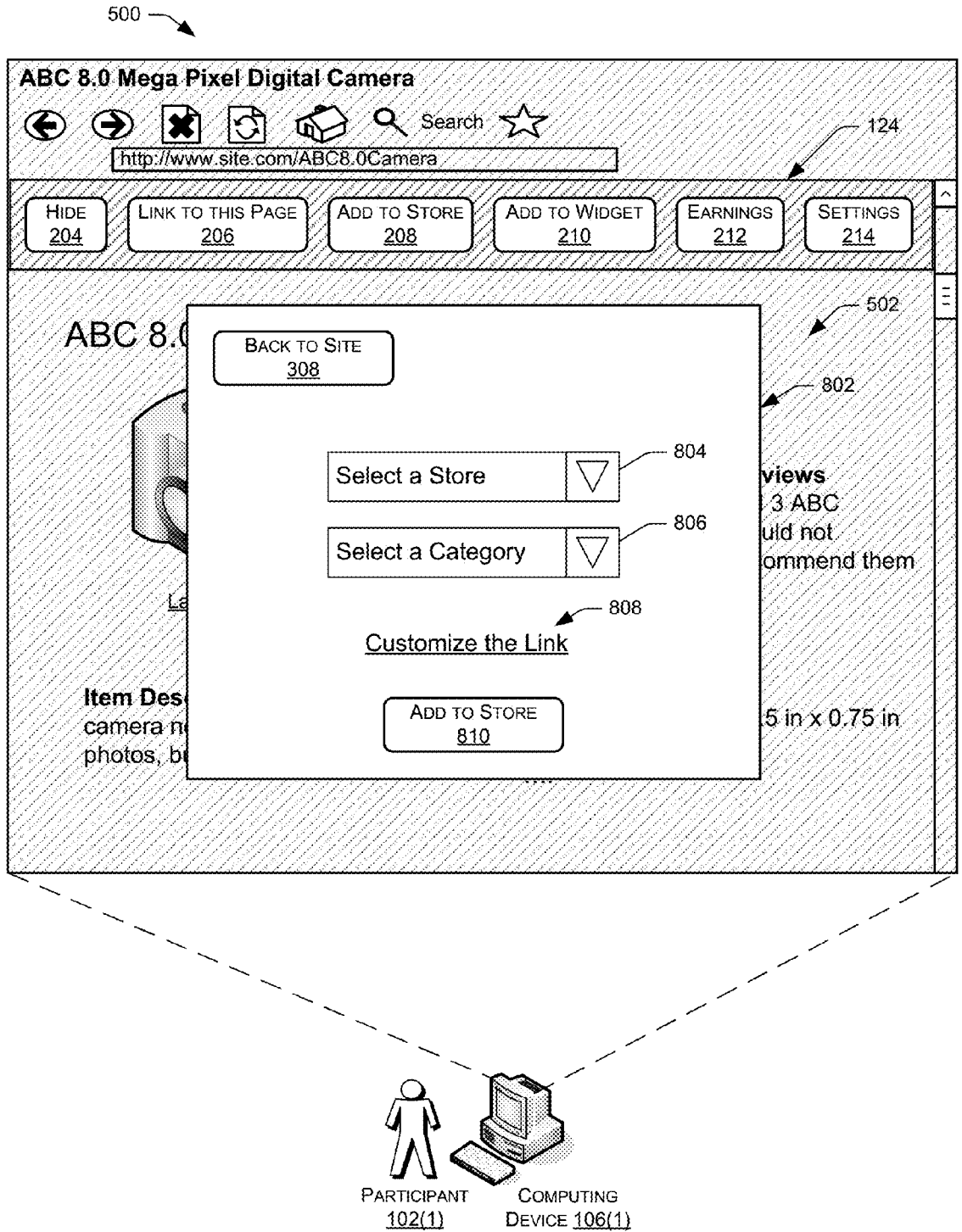
FIG. 8 illustrates an example UI that the content site may serve in response to the participant choosing to add the item illustrated in FIG. 5 to a store of the participant.

FIG. 8 illustrates the example user interface 500 from FIG. 5 after participant 102(1) has chosen to add the illustrated item to a store of the participant via selection of icon 208. As illustrated, content site 110 here serves an overlay 802. Overlay 802 may first include an option 804 that allows participant 102(1) to select one or more stores of multiple stores to which the participant would like to add the illustrated item. Additionally, overlay 802 may allow the participant to select an option to create a new store that, when selected, may initiate a process for creating a new participant store. In instances where participant 102(1) is associated with a single store, meanwhile, overlay 802 may or may not omit option 804. After participant 102(1) selects a store (e.g., a participant store that reviews and markets electronics), an option 806 may allow participant 102(1) to select a category within the store or to create a category within the store to which to add the item. Here, for instance, participant 102(1) may choose to add the item to a category entitled "Digital Cameras" of his or her electronics store. If the participant's store comprises a single category (or no categories), then overlay 802 may or may not omit option 806. In instances, where the participant selects to create a new category, meanwhile, process 800 may proceed to request that the participant name the new category.

Overlay 802 also includes an option 808 to "Customize the Link" to be placed within the store. Selection of option 808 may allow participant 102(1) to customize the link in any number of the ways discussed above with regards to the creation of item links and, potentially, in numerous other ways. For instance, participant 102(1) may select a textual description of the item, colors of the text, the background and the link, whether the participant would like an image of the item to appear in the store, whether the participant would like one or more additional images to appear with the item, as well as any other customizable preferences of the participant.

Finally, overlay 802 includes an icon 810 entitled "Add to Store." Upon selection of icon 810, site 110 may add a link to the selected store and category of the participant. Furthermore, site may customize this link in accordance with the participant's selections before inserting this link into the participant store.

Figure 9:
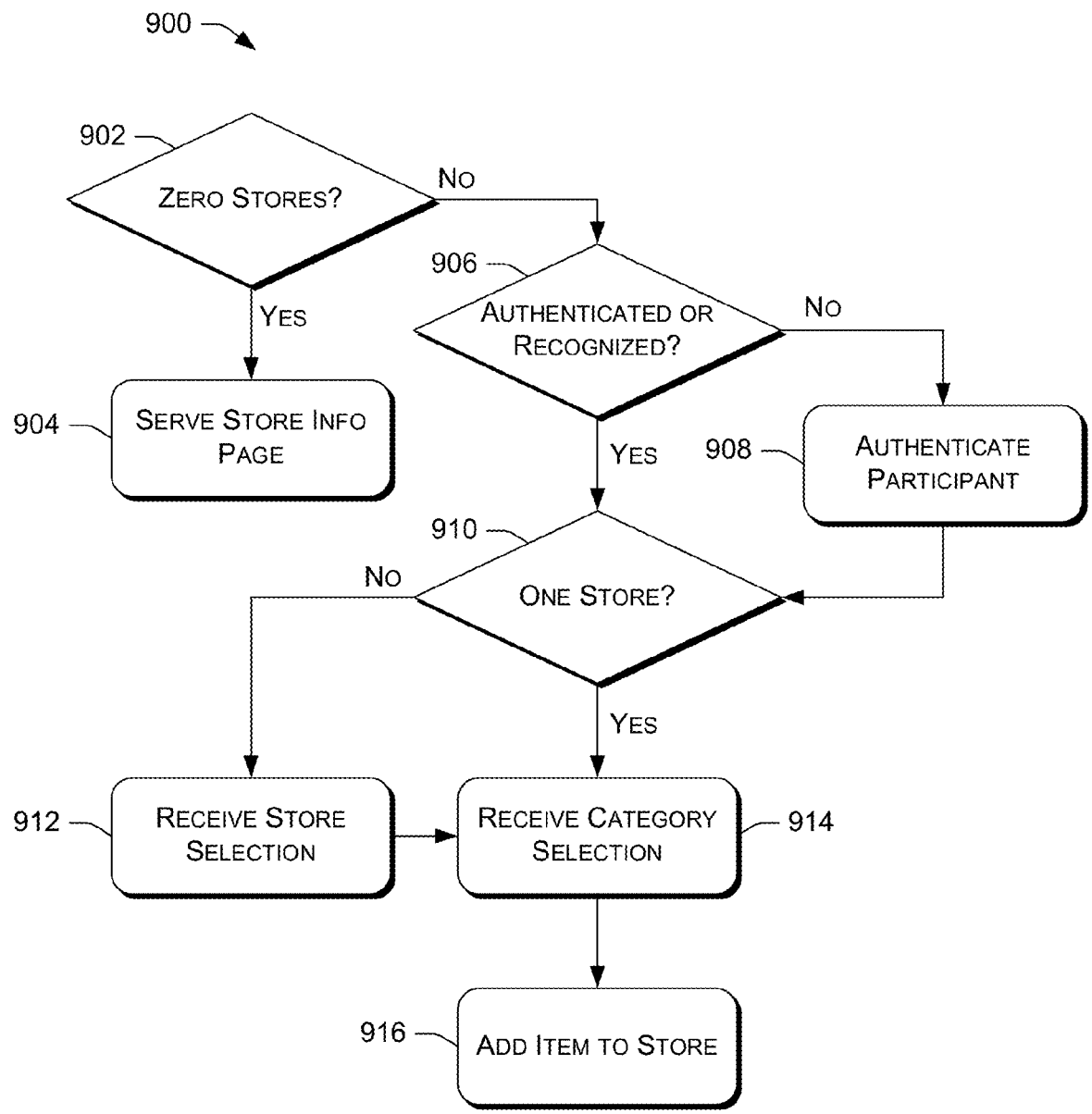
FIG. 9 illustrates an example flow diagram that the content site may implement when a participant chooses to add an item to a store of the participant.

FIG. 9 illustrates an example process 900 that content site 110 may implement when a participant chooses to add an item to a store of the participant. For instance, site 110 may implement process 900 after participant 102(1) selects icon 208 from user interface 500. Process 900 includes operation 902, at which point site 110 may determine whether participant 102(1) is associated with zero stores. That is, site 110 may determine if participant 102(1) actually has a store to which to add the illustrated item. If not, then process 900 proceeds to operation 904, at which point site 110 may serve a page that includes information about how the participant (or non-participant as it may be) may sign up to host or otherwise manage a participant store.

If site 110 determines that the requesting user is indeed associated with a participant store, the process 900 proceeds to operation 906. Here, site 110 determines if participant 102(1) is authenticated or recognized. If not, site 110 proceeds to authenticate the participant at operation 908. If so (or after the participant authenticates), operation 910 determines whether or not the participant is associated with a single store. If not (that is, if participant 102(1) is associated with multiple stores), then site 110 requests, at operation 912, that the participant select one or more of the participants stores to which site 110 should add the item. After site 110 receives a store selection or after determining that the participant is associated with a single store, site 110 requests that the participant select which category of the selected store to which to add the item. After site 110 receives this category selection at operation 914, site 110 adds the item to the selected category of the selected store at operation 916.

As discussed above, mechanism 124 may also include icon 210 that, when selected, allows participant 102(1) to add a link to the illustrated content in a widget on the participant's site. In some instances, site 110 and/or other entities allow participants to insert one or more widgets into a site of the participant. In these instances, participant 102(1) may navigate to a desired item on site 110 and, thereafter, may select icon 210 to add a link to this item on a participant's widget. Once participant 102(1) selects this icon, site 110 may allow the participant to choose many of the same or different options as discussed above in regards to icons 206 and 208. For instance, participant 102(1) may choose whether to include, text, image(s), or a combination thereof. Participant 102(1) may also allow choose colors, layout, and any other details appropriate for the particular widget in which the participant will insert the link to the item.

In addition or in the alternative to allowing participants to create links to content of site 110, mechanism may also include content that is customized based on one or both of an identity of the participant that requests certain content or based on the requested content itself. For instance, if participant 102(1) submits a request for content to site 110 (e.g., in the form of a URL), site 110 may serve the requested content in addition to mechanism 124. Mechanism 124 may include content that is customized based on the URL and/or based on information that is associated with and specific to the particular participant 102(1). In some instances, site 110 may first ensure that participant 102(1) is authenticated before displaying customized content on mechanism 124.

Figure 10:
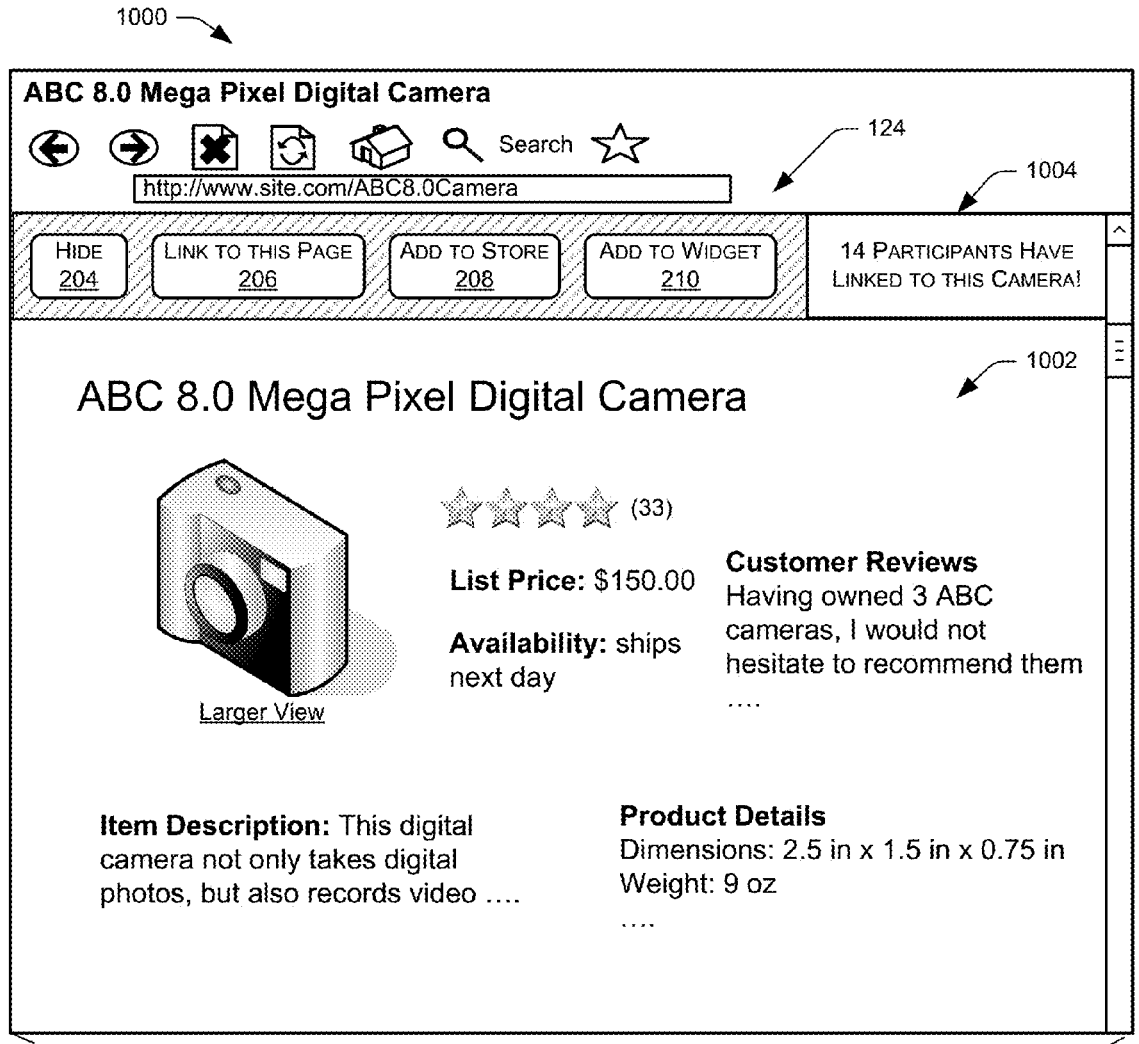
FIG. 10 illustrates yet another UI that the content site may serve to a participant of FIG. 1. Here, the UI includes requested content in the form of item details and customized content that is based on the requested content.
Figure 10:
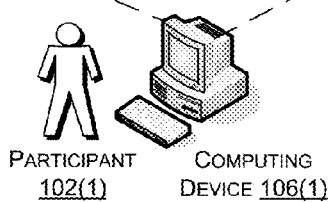

FIG. 10, for instance, illustrates an example user interface 1000 that content site 110 may serve to a participant of an affiliate marketing program, such as participant 102(1), in response to receiving a request for content. In this example, participant 102(1) submitted a request via device 106(1) in terms of a particular URL (http://www.site.com/ABC8.0DigitalCamera). In response, site 110 serves user interface 1000, which includes requested content 1002 in the form of item details and mechanism 124. Here, mechanism 124 includes content 1004 that is customized based on requested content 1002.

Customized content 1004 may include any information that is derived from requested content 1002. In the current example, customized content 1004 informs participant 102(1) that fourteen (14) other participants have created a link in their corresponding participant sites to requested content 1002 (here, the digital camera). Of course, it is noted that this example is merely illustrative, and that customized content 1004 may include any other information that is based on content 1002. For instance, customized content 1004 may indicate a sales rank of the illustrated item, an availability of the illustrated item, a rating of the illustrated item, a recommendation of a type of linking mechanism for use with the illustrated item, or any other content that is specific to the illustrated camera.

In the alternative to providing content that is customized based on the requested content, mechanism 124 may provide content that is customized based on an identity of the requesting participant. Furthermore, in some instances this content may be customized based on the requested content and the identity of the requesting participant.

Figure 11:
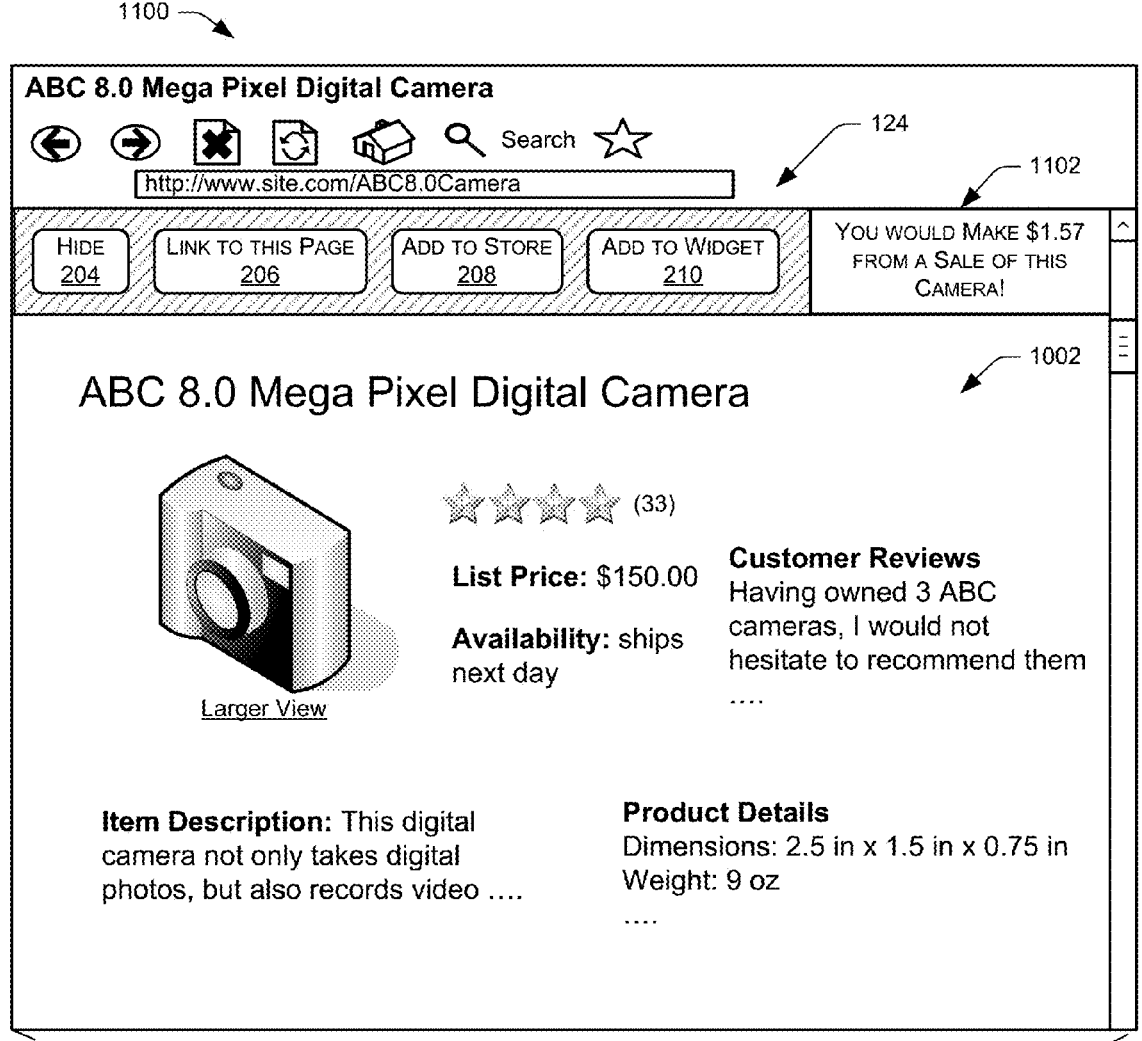
FIG. 11 illustrates yet another UI that the content site may serve to a participant of FIG. 1. Here, the UI again includes requested content in the form of item details and customized content that is based on an identity of the participant.
Figure 11:
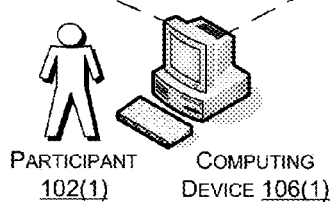

FIG. 11, for instance, illustrates another example user interface 1100 that site 110 may serve to participant 102(1) in response to receiving a request for content from the participant. As illustrated, user interface 1100 again includes requested content 1002 as well as customized content 1102. Here, customized content 1102 is based on an identity of participant 102(1) as well as on the substance of requested content 1002. Specifically, mechanism 124 indicates that participant 102(1) would receive $1.57 from a sale of the illustrated camera. That is, content 1102 indicates that if participant creates a link (e.g., creates a product link, adds the item to a store or widget, etc.) to the illustrated camera on site 126 of participant 102(1), and if a user were to select this link from site 126 and proceed to purchase the illustrated camera from site 110, site 110 would compensate participant 102(1) $1.57 for the sale.

Because rewards or compensation pacts vary between site 110 and different participants, this amount is based on the particular pact between site 110 and participant 102(1).

Therefore, customized content 1102 is based at least in part on the identity of participant 102(1). Furthermore, because compensation from site 110 to participants of the affiliate marketing program is also based on a sales amount, the illustrated compensation figure ($1.57) is also based on the price of the illustrated camera and, hence, on the content 1002 that participant 102(1) originally requested.

Again, while customized content 1102 here indicates an amount that site 110 will compensate participant 102(1) for causing a sale of the illustrated camera, it is to be appreciated that customized content 1102 could alternatively or additionally comprise any information that is based on the identify of participant 102(1) and/or based on requested content 1002. For instance, content 1102 could indicate the performance of participant 102(1) for a current period, a total number of sales or earnings for the current period, a number of sales needed to reach a next predefined sales plateau, an item that site 110 recommends that participant 102(1) link to, and/or any other information.

Illustrative Process

Figure 12:
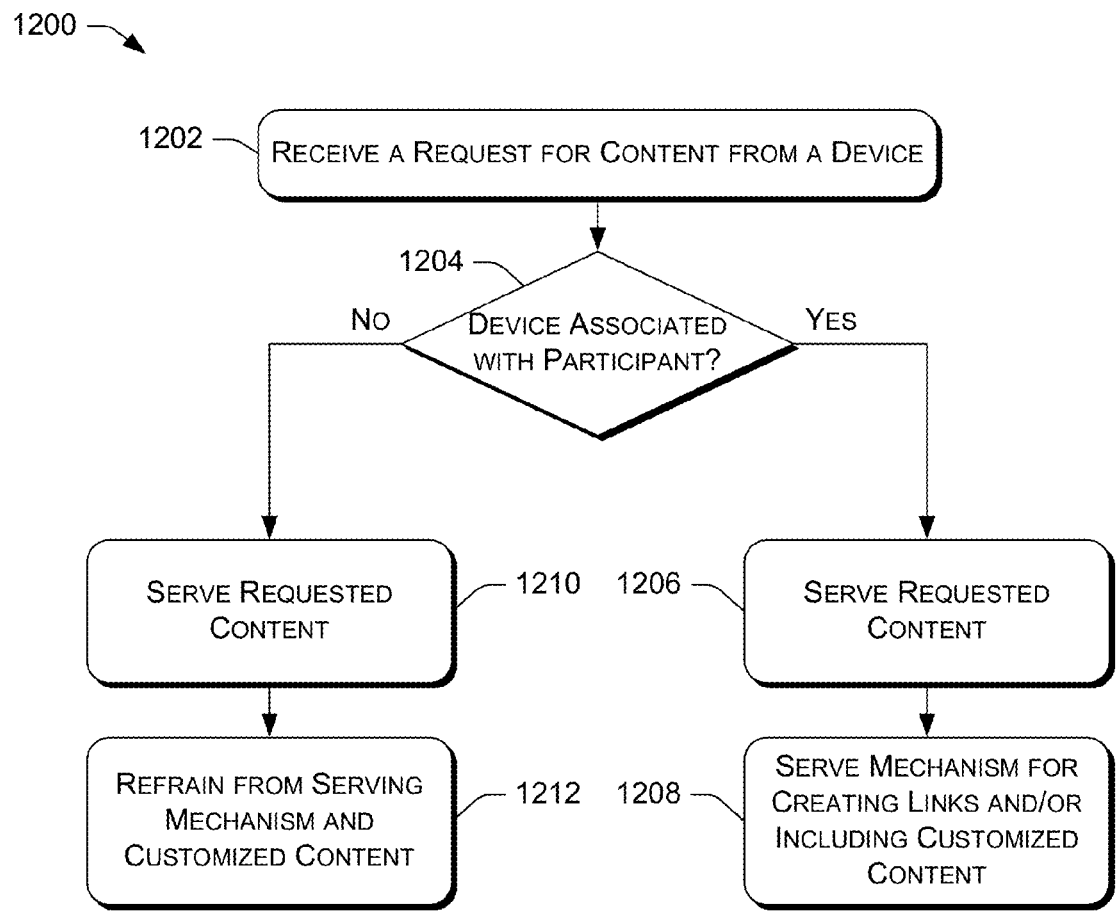
FIGS. 12-13 are flow diagrams of example processes for serving link-creation mechanisms and for serving customized content to participants of an affiliate marketing program.
Figure 13:
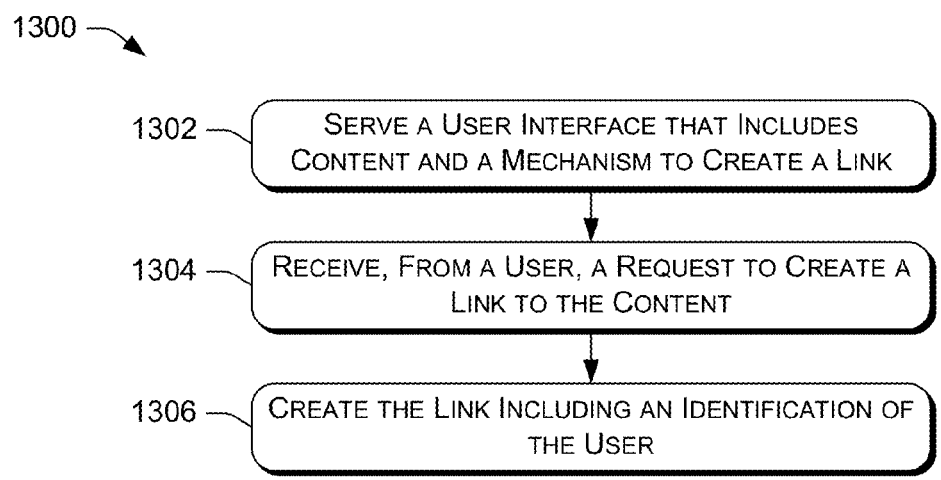

FIGS. 12-13 illustrate example processes 1200 and 1300 for implementing the claimed techniques discussed above. These processes (as well as the processes described below) are each illustrated as a collection of blocks in a logical flow graph, which represent a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process.

FIG. 12 illustrates process 1200, which includes receiving a request for content from a computing device at operation 1204. For instance, site 110 may receive a request for content in the form a uniform resource locator (URL) from one of participants 102 or from one or non-participants 104. Next, operation 1206 determines whether the device that sent the request is associated with a participant of an affiliate marketing program and, if so, if settings associated with this participant indicate that site 110 should serve a mechanism such as mechanism 124 described above. If so, operation 1208 serves the requested content and operation 1210 serves a mechanism for creating links to the content and/or a mechanism that includes customized content. For instance, site 110 may serve a mechanism having similar features to those described above with regards to mechanism 124.

If, however, process 1200 navigates down the "No" branch of operation 1206, then operation 1212 serves the requested content. Operation 1214, however, refrains from serving the mechanism for creating and/or the mechanism that includes customized content. As such, site 110 serves this mechanism to some or all participants of the affiliate marketing program, while refraining from serving this mechanism to non-participants of the program.

FIG. 13 illustrates process 1300. This process includes operation 1302, at which point an entity, such as site 110, serves a user interface that includes requested content and a mechanism for creating links. For instance, site 110 may serve one of user interfaces 200, 500, 1000, or 1100, as described above. Next, operation 1304 receives, from a user (e.g., participant 102(1) or another user), a request to create a link to the requested content. In response, operation 1306 creates a link to the content, with the link including an identification of the requesting user. Once created, an entity such as site 110 may output this created link for insertion into a site associated with the requesting user. Because the created link includes an identification of the user, when another user navigates to the user's site and selects the link, site 110 will extract the identification of the user. In some instances, site 110 may use this extracted identity in order to compensate the user in accordance with policies of an affiliate marketing program that site 110 offers.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A computer-implemented method comprising:
   under control of a first computing device executing specific computer-executable instructions, the first computing device associated with an electronic marketplace that maintains an electronic catalog of items and that offers an affiliate marketing program,
   storing an identifier of a second computing device;
   receiving a request for content from the second computing device, wherein the content corresponds to an item in the electronic catalog of items;
   determining, based at least in part on the identifier of the second computing device, that the second computing device is associated with a participant of the affiliate marketing program offered by the electronic marketplace;
   based at least in part on determining that the second computing device is associated with a participant of the affiliate marketing program offered by the electronic marketplace, transmitting to the second computing device a graphical user interface configured to at least:
      display the content corresponding to the item, and
      provide a toolbar including a control and customized content, the customized content based at least in part on the content corresponding to the item, the toolbar being configured to receive a request to create a link to the content corresponding to the item;
   receiving, from the second computing device and via the toolbar, at least:
      a request to create the link to the content corresponding to the item, and information associated with the request;
   generating code, based at least in part on the request to create the link and the information associated with the request, for the link to the item in the electronic catalog, the code being configured to be inserted into a network page of a site that is separate from the electronic marketplace and that is associated with the participant of the affiliate marketing program; and
   sending the code to the second computing device.

2. A computer-implemented method comprising:
   under control of a first computing device executing specific computer-executable instructions, the first computing device associated with an electronic marketplace that maintains an electronic catalog of items and that offers an affiliate marketing program, receiving, from a second computing device, a request for content corresponding to an item in the electronic catalog of items;

determining, that the second computing device is associated with a participant of the affiliate marketing program; and based at least in part on determining that the second computing device is associated with a participant of the affiliate marketing program, transmitting a graphical user interface configured to at least:
display the content corresponding to the item; and
provide a toolbar configured to receive a request to create a link to the content corresponding to the item, receiving, from the second computing device and via the toolbar, at least:
a request to create a link to the content corresponding to the item, and information associated with the request; and generating code, based in part on the request to create the link and the information associated with the request, for the link to the item in the electronic catalog, the code being configured to be inserted into a network page of a site, wherein the site is:
(i) separate from the electronic marketplace that maintains the electronic catalog of items, and
(ii) associated with the participant of the affiliate marketing program.

3. A computer-implemented method as recited in claim 2, wherein the code is further configured to be inserted into the network page as part of at least one of a hyperlink, a flash widget, an image, a banner, or embedded content.

4. A computer-implemented method as recited in claim 2, wherein the code includes an identifier associated with the participant of the affiliate marketing program.

5. A computer-implemented method as recited in claim 4, further comprising determining, based at least in part on the identifier included in the code, that a user has navigated to the electronic marketplace, from the site that is associated with the participant of the affiliate marketing program, via selection of the link.

6. A computer-implemented method as recited in claim 2, further comprising determining that a setting associated with the participant of the affiliate marketing program dictates including the toolbar in the graphical user interface generated for display on the second computing device associated with the participant, wherein the graphical user interface is generated for display on the second computing device based at least in part on the setting.

7. One or more computing devices comprising:
one or more processors; and
a computer-readable medium storing computer-executable instructions that, when executed by the one or more processors, cause the one or more processors to:
cause rendering of a graphical user interface on a display on another computing device, the graphical user interface including at least:
a first area including content obtained from a first site that offers an affiliate marketing program; and
a second area including a user interface control element, which in response to a received selection from a user of the another computing device, requests code for a link that maps to at least a portion of the content included in the first area;
receive, via the user interface control element, a request for the code for the link that maps to the at least the portion of the content included in the first area;
based in part on the request for the code, cause rendering of an update to the graphical user interface, the update being configured to present at least one option to input information for customizing the link to receive customization information;
receive, via the graphical user interface, the customization information; and
generate code for the link based at least in part on the request for the code and the customization information received, the link being customized for display on a second site that is associated with a participant of the affiliate marketing program.

8. One or more computing devices as recited in claim 7, wherein the first site hosts an electronic catalog that stores details about a plurality of items, and wherein the content included in the first area comprises a network page including details from the electronic catalog regarding an item of the plurality of items.

9. One or more computing devices as recited in claim 7, wherein the computer-executable instructions, when executed by the one or more processors, further cause the one or more processors to cause rendering of the graphical user interface control element on multiple network pages of content obtained from the first site and included in the first area.

10. One or more computing devices as recited in claim 7, wherein the second site comprises a network page including one or more links, an individual link of the one or more links corresponding to an item that the first site offers for consumption.

11. One or more computing devices as recited in claim 7, wherein the code for the link is inserted into a network page of the second site as part of a widget.

12. One or more computing devices as recited in claim 7, wherein the code for the link is inserted into a network page of the second site as part of at least one of: a hyperlink, a flash widget, an image, a banner, or embedded content.

13. A non-transitory computer-readable medium storing computer-executable instructions that, when executed on one or more processors, perform operations comprising:
generating a graphical user interface for display on a computing device, the graphical user interface including both content and a toolbar configured to receive a request to generate code for a link to at least a portion of the content;
receiving, via the toolbar, a request to generate the code for the link to the at least a portion of the content, the link configured for display on a page of a site associated with a user; and
responsive to receiving the request, generating the code for the link to the content, the code for the link including an identification of the user.

14. A non-transitory computer-readable medium as recited in claim 13, wherein the user is a first user, and further storing computer-executable instructions that, when executed on the one or more processors, perform operations comprising:
outputting the code for the link to the computing device of the first user;
generating the content for display on a computing device of a second user in response to the second user selecting the link from the page of the site associated with the first user; and extracting, from the code for the link, the identification of the first user.

15. A non-transitory computer-readable medium as recited in claim 13, further storing computer-executable instructions that, when executed on the one or more processors, perform operations comprising:
determining that the computing device is associated with a participant of an affiliate marketing program; and
wherein the generating the graphical user interface for display on the computing device is based at least in part on the determining that the computing device is associated with a participant of an affiliate marketing program.

16. A non-transitory computer-readable medium as recited in claim 13, further storing computer-executable instructions that, when executed on the one or more processors, perform operations comprising:
determining, that the computing device is associated with a participant of an affiliate marketing program; and
determining that the participant has chosen to view the toolbar,
wherein the generating the graphical user interface including the toolbar for generating code for a link to the content is based at least in part on the determining that the computing device is associated with the participant of the affiliate marketing program and the determining that the participant has chosen to view the toolbar.

17. A non-transitory computer-readable medium as recited in claim 13, further storing computer-executable instructions that, when executed on the one more processors, perform operations comprising:
hosting an electronic marketplace that maintains an electronic catalog of items, the electronic marketplace offering an affiliate marketing program, wherein the user is a participant in the affiliate marketing program offered by the electronic marketplace.

18. A non-transitory computer-readable medium as recited in claim 13, further storing computer-executable instructions that, when executed on the one or more processors, perform operations comprising:
hosting an electronic marketplace that maintains an electronic catalog of items, the electronic marketplace offering an affiliate marketing program, wherein the site associated with the user includes multiple links, a link of the multiple links corresponding to an item that the electronic marketplace offers for consumption.

19. A non-transitory computer-readable medium as recited in claim 13, further storing computer-executable instructions that, when executed on the one or more processors, perform operations comprising:
hosting an electronic marketplace that maintains an electronic catalog of items, wherein the site associated with the user is independent from the electronic marketplace.

20. A non-transitory computer-readable medium as recited in claim 13, wherein the code for the link to the content is configured for: (i) insertion on a network page of the site associated with the user, or (ii) insertion into a network page as part of at least one of a flash widget, an image, a banner, or embedded content.

21. A non-transitory computer-readable medium storing computer-executable instructions that, when executed on one or more processors, perform operations comprising:
associating a user as a participant in an affiliate marketing program offered by an electronic marketplace;
receiving a request for content from a computing device, wherein the content corresponds to an item in an electronic catalog of items;
determining, based at least in part on an identifier associated with the computing device, that the computing device is associated with the user;
based at least in part on determining that the computing device is associated with the user, transmitting a graphical user interface configured to at least:
display the content corresponding to the item,
receive a user action; and
based at least in part on the user action, provide a toolbar configured to receive a request to create a link to at least a portion of the content corresponding to the item;
receiving, from the computing device and via the toolbar, at least:
a request to create the link to the at least the portion of the content corresponding to the item, and
information associated with the request;
generating code, based at least in part on the request to create the and the information associated with the request, for the link to the at least the portion of the content corresponding to the item, the code being configured to be inserted into a network page of a site that is separate from the electronic marketplace and that is associated with the participant of the affiliate marketing program; and
sending the code to the computing device.

22. A non-transitory computer-readable medium as recited in claim 21, wherein the electronic catalog of items is associated with the electronic marketplace.

23. A non-transitory computer-readable medium as recited in claim 21, wherein the graphical user interface comprises an embedded script configured to cause a display of the toolbar based upon the user action.

24. A non-transitory computer-readable medium as recited in claim 21, wherein the graphical user interface comprises an embedded script configured to cause the toolbar to be hidden based upon the user action.

25. A non-transitory computer-readable medium as recited in claim 21, wherein the computer-executable instructions are further configured to, when executed on one or more processors, storing the code in association with the user for later use.

26. A non-transitory computer-readable medium as recited in claim 21, wherein the toolbar is further configured to display an accounting of earnings acquired by the user via the affiliate marketing program.

27. A non-transitory computer-readable medium as recited in claim 21, wherein the graphical user interface is a first graphical user interface, and wherein the computer-executable instructions are further configured to, when executed on one or more processors, perform operations comprising:
based in part on the receiving the request to create the link to the at least the portion of the content corresponding to the item, transmitting to the computing device a second graphical user interface configured to at least receive customization information associated with the request to create the link,
receiving, from the computing device and via the second graphical user interface, the customization information, and
wherein generating the code is further based upon the customization information.

28. A non-transitory computer-readable medium as recited in claim 27, wherein the customization information comprises a selection of a store the link is to be associated with.

29. A non-transitory computer-readable medium as recited in claim 27, wherein the customization information comprises a selection at least one of a text link, a page link, an item link, and a product link.

30. A non-transitory computer-readable medium as recited in claim 27, wherein the customization information comprises a selection of how the link will appear on the network page.

31. A non-transitory computer-readable medium as recited in claim 27, wherein the toolbar is further configured to present an option to hide the toolbar.

\* \* \* \* \*